United States Patent [19]

Wern

[11] Patent Number: 5,272,897
[45] Date of Patent: Dec. 28, 1993

[54] PART HOLD DOWN APPARATUS FOR PART PROCESSING MACHINE

[75] Inventor: Michael J. Wern, Mokena, Ill.

[73] Assignee: Engineered Abrasives, Inc., Worth, Ill.

[21] Appl. No.: 881,684

[22] Filed: May 12, 1992

[51] Int. Cl.$^5$ .......................... B21J 13/08; B24C 9/00
[52] U.S. Cl. ........................................ 72/53; 51/419; 269/254 CS; 279/4.01
[58] Field of Search ............... 72/53; 269/254 CS, 50; 82/148; 408/95, 97; 409/62, 234; 279/4.01; 51/417, 419, 42

[56] References Cited

U.S. PATENT DOCUMENTS

| | | | |
|---|---|---|---|
| 2,352,857 | 7/1944 | Nachemov | 269/254 |
| 2,420,759 | 5/1947 | Stelz | 408/95 |
| 2,725,685 | 12/1955 | Hill | 51/419 |
| 3,613,424 | 1/1969 | Normos | 72/53 |

FOREIGN PATENT DOCUMENTS

| | | | |
|---|---|---|---|
| 0076306 | 6/1981 | Japan | 82/148 |
| 0271175 | 10/1989 | Japan | 72/53 |

Primary Examiner—David Jones
Attorney, Agent, or Firm—Trexler, Bushnell, Giangiorgi & Blackstone, Ltd.

[57] ABSTRACT

An automatic machine for processing parts comprises at least two part hold down apparatuses, each for releasably holding one of the parts in a predetermined position during processing. The apparatuses are shiftable between an open position for accepting the parts and a closed position for holding the parts for processing. A pneumatic cylinder is operatively conjunctively associated with the apparatuses for providing a conjunctively variable compensating cushioned clamping of the parts for maintaining the parts in the predetermined position during processing. A spring is operatively independently associated with each of the apparatuses for providing an independent variable compensating cushioned clamping of the parts for maintaining the parts in the predetermined position during processing.

6 Claims, 4 Drawing Sheets

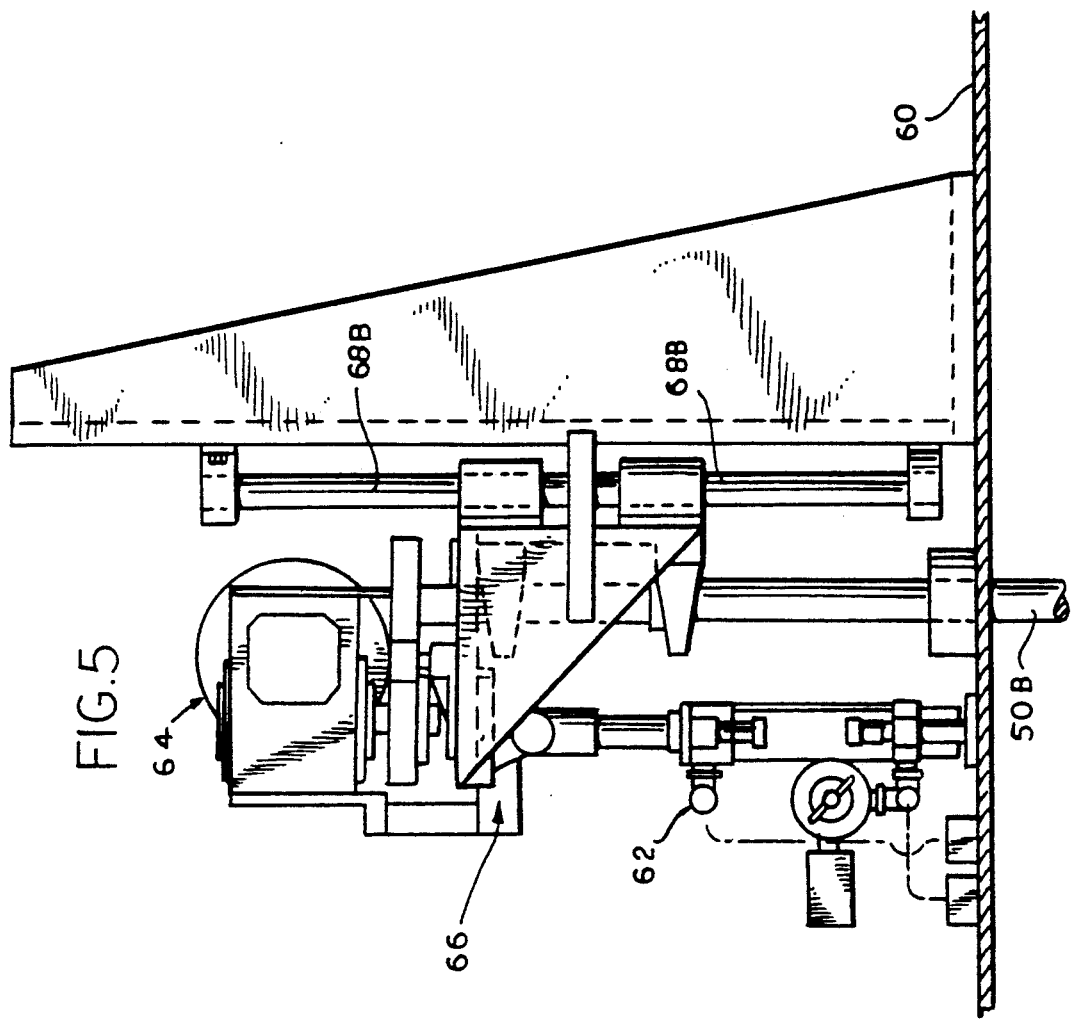
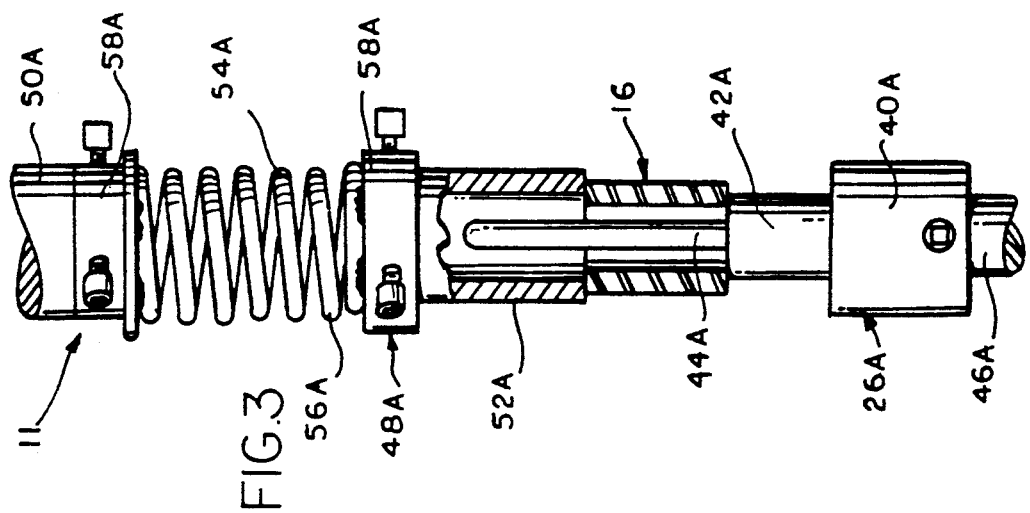

PART HOLD DOWN APPARATUS FOR PART PROCESSING MACHINE

BACKGROUND AND SUMMARY OF THE INVENTION

The present invention generally relates to an automatic part processing machine for fully automatically processing a part or workpiece by methods such as shot peening and the like, having a novelly constructed part hold down apparatus. The invention more specifically relates to a novel construction of a part hold down apparatus for use in fully automatic processing of a part or workpiece.

Today, many machined or fabricated parts or workpieces must be processed before they are included in or assembled into a larger, final product or machine. An example of such a part is a gear utilized in automobile transmissions. Once these gears are formed, they should be processed by shot peening machines, and the like, to insure that the gears meet government and manufacturer specifications, as well as to insure that the gears are suitable for performing their intended functions. The methods of shot peening or processing of such parts can be quite complex, difficult, and time consuming.

Utilizing the machines, apparatuses and methods of the prior art, such parts are processed or shot peened in the following manner. The parts are manually mounted on a part hold down apparatus of a shot peening machine in a predetermined disposition such that the relevant surfaces of the part are subjected to the peening process Because it is desirable to subject all such surfaces to peening equally to achieve uniform processing of the part, the apparatus is rotated, usually on the order of thirty to forty revolutions per minute (rpm's), while a high velocity peening fluid, usually bearing a shot of sorts, is forcibly directed at the part.

When the high velocity shot interacts with the part, the part may begin to rotate with respect to the apparatus under the influence of forces applied to the part by the shot. Accordingly, the part does not rotate conjointly with the apparatus, thereby resulting in uneven peening of the part as well as possible damage to the part and the apparatus. Furthermore, the part may become operatively dislodged from the apparatus such that the part does not rotate at all, again resulting in uneven peening. Parts unevenly peened or damaged during processing often do not meet the relevant government or manufacturer standards. Thus, these parts may have to be discarded, resulting in lost revenues to the manufacturer.

In an effort to prevent rotation of the part with respect to the apparatus during peening, or other processing for that matter, a forced fit is formed, such as by pressing the part onto the apparatus by means of repeated strikes with a hammer. This forced fit provides the part with sufficient resistance to the forces generated by the interaction with the high velocity shot so that the part does not rotate with respect to the apparatus during peening.

This forced fit, however, has certain drawbacks. While the forced fit may be sufficient for preventing rotation of the part independent of the apparatus, the application of the forced fit makes processing of the part tedious and time consuming. Specifically, because of the nature of the forced fit, each individual part must be manually applied to the apparatus. This manual application results in increased labor costs to the processor or part manufacturer. Also, the forced fit must be carefully manually applied so as to prevent damage of the part. This is particularly important upon consideration of variances inherent in many manufactured parts.

Additionally, after processing, the part may be difficult to remove from the apparatus, due to the necessary strength of the forced fit. Thus, each part must be individually manually removed from the apparatus after processing. This removal must also be done with care to avoid damage of the part. Accordingly, utilization of a forced fit between the part and the apparatus adds significantly to the cost of the part.

A part hold down apparatus, constructed according to the teachings of the present invention, is intended to solve some, if not all, of the problems inherent in the prior art hold down apparatus discussed hereinabove. The part hold down apparatus of the invention eliminates the need for a forced fit and allows for fully automatic part processing, thereby reducing manufacturing costs.

OBJECTS AND SUMMARY OF THE INVENTION

A general object of the present invention is to provide an automatic part processing machine for processing a part or a workpiece having a novelly constructed part hold down apparatus.

A more specific object of the invention is to provide a novel part hold down apparatus for use in automatic processing of the part.

Another object of the present invention is to provide a part hold down apparatus which holds a part by means of a variably compensating cushioned clamping of the part.

An additional object of the invention is to provide a part hold down apparatus which prevents rotation of the part caused by shot interaction, thereby insuring proper peening of the part.

A further object of the present invention is to provide a part hold down apparatus which does not require formation of a forced fit between the part and the apparatus to securely hold the part for peening or processing.

Another object of the invention is to provide a part hold down apparatus which releasably holds the part during processing, but automatically releases the part after processing so that the part can be automatically removed by machine.

An additional object of the present invention is to provide a part hold down apparatus which compensates for part variations so that the parts are properly held for processing.

A further object of the invention is to provide a part hold down apparatus which allows a part to be fully automatically processed.

An automatic machine for processing parts comprises at least two part hold down apparatuses, each for releasably holding one of the parts in a predetermined position during processing. The apparatuses are shiftable between an open position for accepting the parts and a closed position for holding the parts for processing. A pneumatic cylinder is operatively conjunctively associated with the apparatuses for providing a conjunctively variable compensating cushioned clamping of the parts for maintaining the parts in the predetermined position during processing. A spring is operatively independently associated with each of the apparatuses for providing an independent variable compensating cushioned clamping of the parts for maintaining the parts in the predetermined position during processing.

BRIEF DESCRIPTION OF THE DRAWINGS

The organization and manner of the structure and operation of the invention together with further objects and advantages thereof, may best be understood by reference to the following description taken in connection with the accompanying drawings, wherein like reference numerals identify like elements in which:

FIG. 3 is an enlarged, partially sectioned front elevational view of one of the part hold down apparatuses of FIG. 2, with said apparatus being in a closed position and releasably holding a part;

FIG. 5 is a partially sectioned side elevational view of the apparatus rotating and apparatus shifting means.

DETAILED DESCRIPTION OF THE PREFERRED EMBODIMENT

Figure 1:
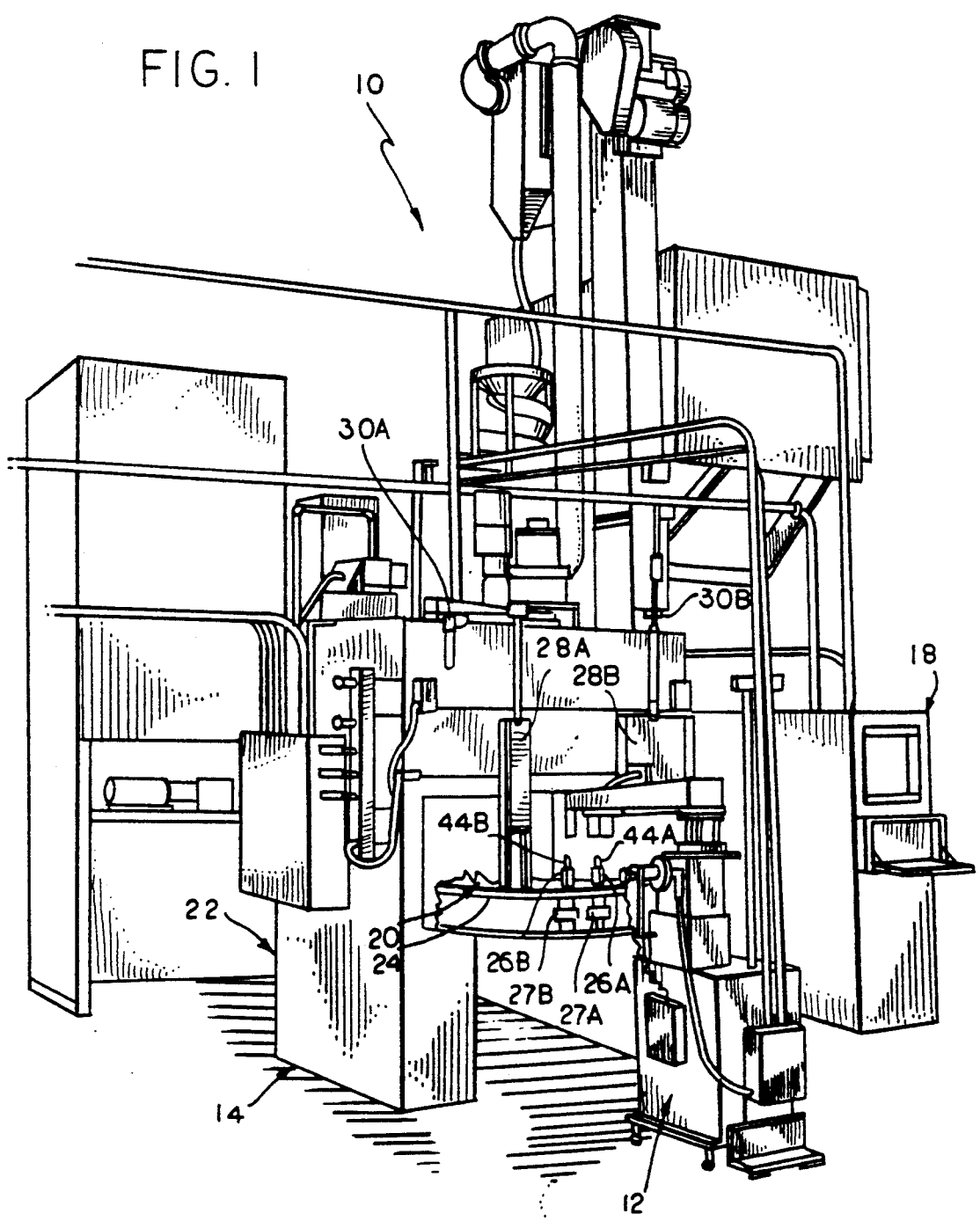
FIG. 1 is a front perspective view of an automatic part processing machine for processing a part by methods such as peening, and the like, with a portion thereof broken away to reveal a turntable and a set of lower spindles, and having a part hold down apparatus constructed according to the teachings of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 2:
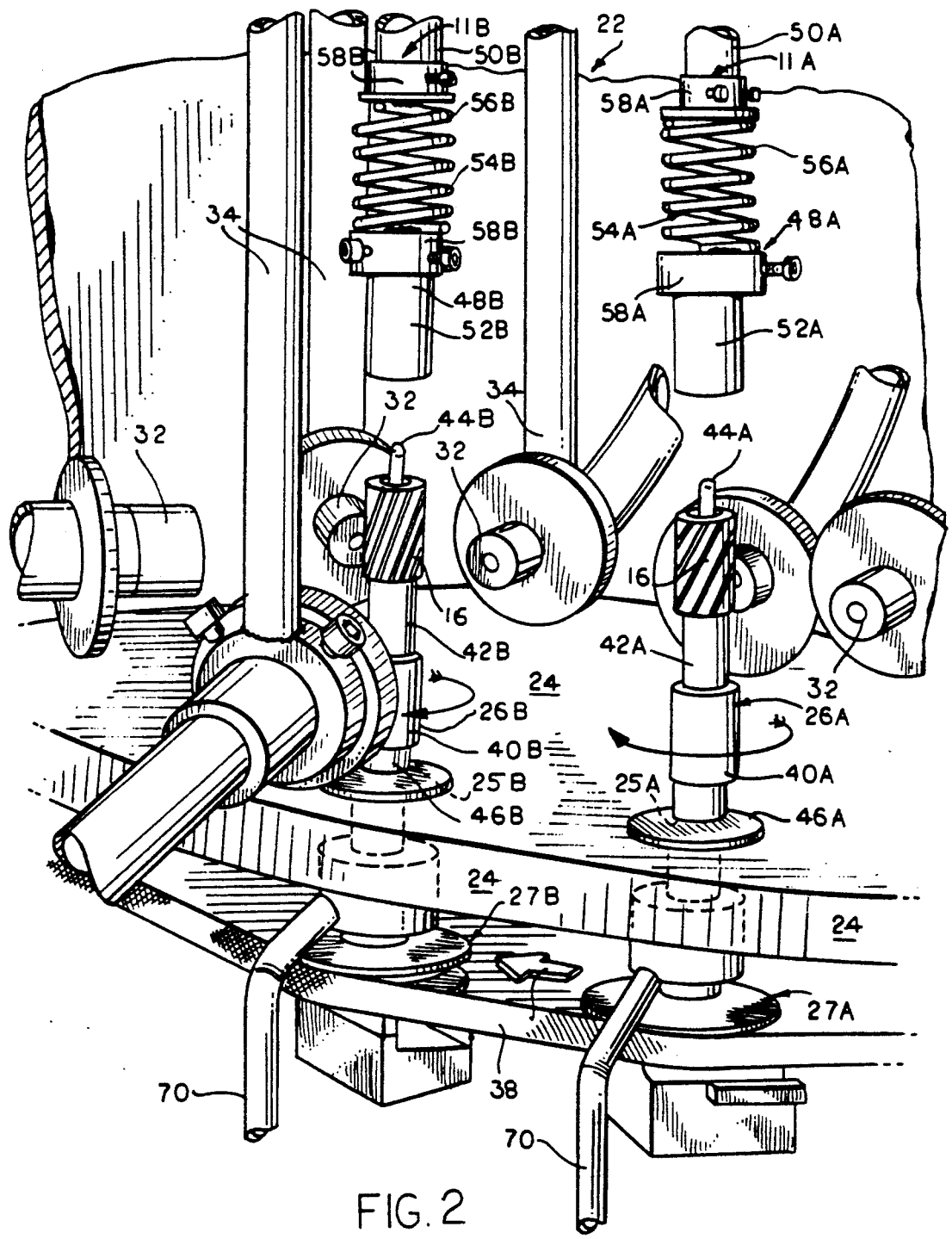
FIG. 2 is a perspective view of a part processing or peening chamber in the machine of FIG. 1, showing the novel construction of the part hold down apparatus, with said apparatus being in an open position.

Referring initially to FIG. 1, a part processing machine 10 for processing, such as shot peening and the like, a part 16, such as a gear and the like, having part hold down apparatuses 11A and 11B, constructed according to the teachings of the present invention, and illustrated in FIGS. 2 and 3, is shown. It is to be clearly understood that, while the invention is disclosed with respect to its employment with a shot peening part processing machine, the apparatuses 11A and 11B can be effectively utilized in a number of different employments without departing from the intended scope of the invention. Also, while the invention is discussed with respect to the employment of a pair of apparatuses 11A and 11B, it is to be noted that the invention, without departing from the scope thereof, can be utilized with either lesser or greater numbers of apparatuses 11A and 11B.

As shown in FIG. 1, the machine 10 is fully automatic and comprises an unload/load element or machine 12 and a processing or peening element, chamber or machine 14 operatively associated with the automatic machine 12. The machine 12 is of known construction, and is capable of picking up a part 16 from a supply bin or other part storage facility, not shown, placing the part 16 in a position on the machine 14 for peening, and removing the part 16 from the machine 14 after peening.

The operation of the machines 12 and 14 is monitored and controlled by a suitable control device 18, such as an appropriate computer and the like, shown generally in FIG. 1. In this manner, the machine 10 is capable of fully automatic operation.

The machine 14 has a part unloading/loading portion 20, shown in FIG. 1, and a part peening portion 22, shown partially in FIG. 2, on opposite sides thereof. The machine 14 generally comprises a rotatable or indexible turntable 24 having, preferably, four sets, only one being visible in FIGS. 1 and 2, of two part holding members in the form of identical lower rotatable spindles 26A and 26B for accepting parts 16 from the machine 12. The spindles 26A and 26B, the construction of which will be discussed in more detail hereinafter, extend through holes 25A and 25B, respectively, in the table 24 from one side thereof to the other, as shown in FIG. 2.

Ends of the spindles 26A and 26B, opposite to the ends thereof carrying the parts 16, are connected to pulley assemblies 27A and 27B, respectively, for rotating the spindles 26A and 26B during the peening process, as will be discussed later. The spindles 26A and 26B carry the parts 16 into and out of the part peening portion 22 when the table 24 is properly rotated. The four sets of spindles 26A and 26B are preferably circumferentially offset from each other substantially every ninety degrees proximate the circumference of the table 24. Additionally, the table 24 rotates such that, at any given moment, one set of spindles 26A and 26B is in the peening portion 22, and another, diametrically opposite set is disposed adjacent the machine 12 so that parts 16 can be unloaded from and loaded onto that set of spindles 26A and 26B.

It is to be noted that the portion 20 is bounded by a pair of doors 28A and 28B shiftable between an open position, shown in FIG. 1, and a closed position. The doors 28A and 28B are shifted by automatic means 30A and 30B controlled by the device 18. The doors 28A and 28B effectively seal the peening portion 22 from a surrounding atmosphere so that shot used in the peening process cannot leave the portion 22 at a high velocity during the peening process. This insures that the surrounding environment will not be contaminated by the shot. The doors 28A and 28B also serve to contain noise generated during the peening process.

The construction of the peening portion 22 is partially illustrated in FIG. 2. The peening portion 22 generally includes a plurality of oscillating nozzles 32 for directing a peening fluid, usually bearing shot, at the parts 16 located on the spindles 26A and 26B. The nozzles 32 are connected to substantially vertically projecting shafts 34, which are, in turn, connected to nozzle oscillating means 36, shown in FIG. 4. The means 36 oscillates the nozzles 32 so that the entirety of the parts 16 can be exposed to the shot. However, mere oscillation of the nozzles 32 is insufficient to properly and thoroughly peen the parts 16.

The pulley assemblies 27A and 27B assist in rotating the spindles 26A and 26B to insure proper and thorough peening of the parts 16. Specifically, as the table 24 is indexed or rotated, the pulley assemblies 27A and 27B of a given set of spindles 26A and 26B are brought into contact with a drive belt 38, shown in FIG. 2. The belt 38 is driven by an appropriate motor, not shown, so that the pulley assemblies 27A and 27B, and thus the spindles 26A and 26B rotate on the order of thirty to forty rpm's. As the spindles 26A and 26B rotate, the parts 16 also rotate conjointly. However, mere placement of the parts 16 on the spindles 26A and 26B by the machine 12 is insufficient to insure that conjoint rotation of the parts 16 and the spindles 26A and 26B will continue throughout the peening process to insure proper peening of the parts 16.

As shown in FIGS. 2 and 3, the lower spindles 26A and 26B are generally cylindrical in configuration and comprise mounting portions 40A and 40B, part supporting portions 42A and 42B, and part guiding portions 44A and 44B. The portions 42A and 42B have a diameter larger than a corresponding diameter of the portions 44A and 44B, but smaller than a corresponding diameter of the portions 40A and 40B. The mounting portions 40A and 40B are for mounting the spindles 26A and 26B, respectively, on rotating shafts 46A and 46B respectively associated with the assemblies 27A and 27B. Thus, the spindles 26A and 26B rotate in response to movement of the belt 38.

The supporting portions 42A and 42B present supporting bearing surfaces for engagement with a portion of the parts 16 of dimensions sufficient so that the parts 16 are supported above the portions 42A and 42B. The guiding portions 44A and 44B project substantially perpendicularly upwards from the supporting portions 42A and 42B, respectively. The portions 44A and 44B are of dimensions sufficient for insertion into a central bore or hole 47, shown in FIG. 3, in the part 16. Thus, when the machine 12 places the hole 47 of a part 16 over the portion 44A or 44B, gravity pulls the part 16 downwardly along the portion 44A or 44B so that the part 16 comes into bearing contact with the portions 42A and 42B.

The portions 44A and 44B provide for a loose fit between the parts 16 and the lower spindles 26A and 26B. This facilitates automatic operation of the machine 10. While the spindles 26A and 26B are illustrated and described with respect to an embodiment adapted for utilization with a particularly configured part 16, it is to be noted that the spindles 26A and 26B can take on a number of different configurations dependent upon the configuration of the particular part to be processed. The same reasoning applies to the construction of upper spindle assemblies discussed hereinbelow. However, the lower spindles should include a part supporting portion and the upper spindles should include a part engaging portion of suitable configuration so that the parts can be variably compensatingly cushionly clamped between those portions.

Thus, to insure proper conjoint rotation of the parts 16 and the spindles 26A and 26B during the peening process, the portion 22 preferably includes a pair of part hold down members in the form of identically constructed, cylindrical, shiftable, rotatable upper spindle assemblies 48A and 48B located in the portion 22 so that the spindles 26A and 26B are axially in alignment with the spindles 48A and 48B, respectively, during the peening process. The spindles 26A and 48A, and 26B and 48B comprise the part hold down apparatuses 11A and 11B, respectively.

The construction of the spindles 48A and 48B is illustrated in FIGS. 2 and 3. Specifically, the spindles 48A and 48B comprise substantially vertically projecting shafts 50A and 50B and part engaging portions 52A and 52B. Ends of the portions 52A and 52B, opposite to the ends thereof connected to the shafts 50A and 50B, clampingly contact the parts 16 on an end thereof opposite to the end supported by the portions 42A and 42B.

The portions 52A and 52B are connected to the shafts 50A and 50B, respectively, by means for providing a variable cushioned clamping of the parts 16 between the portions 42A and 42B and the portions 52A and 52B in the form of spring assemblies 54A and 54B. The spring assemblies 54A and 54B assist in providing the cushioned clamping of the parts 16 onto the portions 42A and 42B, while also allowing the apparatuses 11A and 11B to individually compensate for variances in individual parts 16 disposed on each apparatus 11A and 11B.

The spring assemblies 54A and 54B themselves generally comprise substantially cylindrical coiled springs 56A and 56B operatively located between the shafts 50A and 50B and the portions 52A and 52B, respectively. Opposite ends of the springs 56A and 56B are connected to mounts 58A and 58B for mounting the springs 56A and 56B to the shafts 50A and 50B and the portions 52A and 52B.

Figure 4:
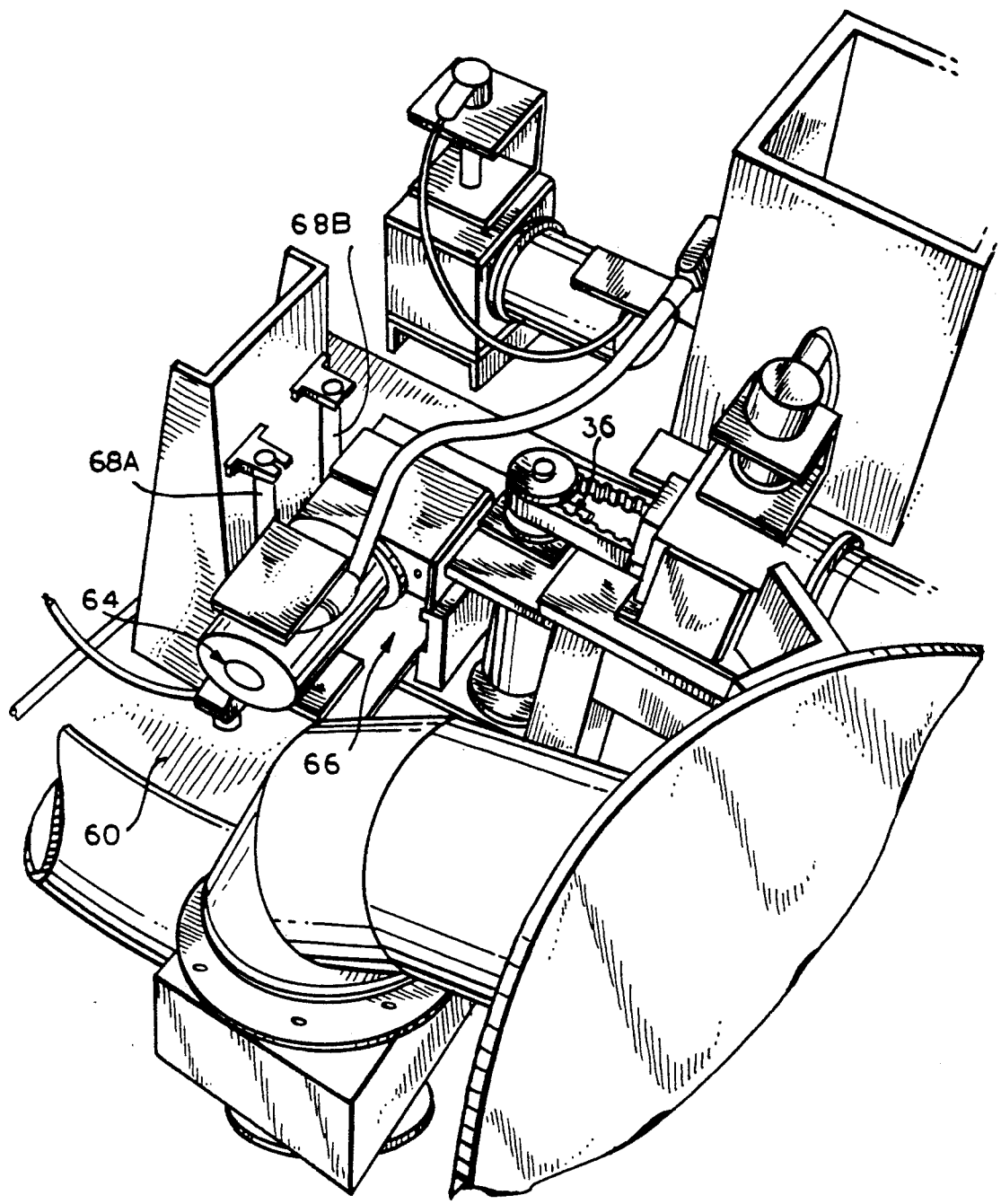
FIG. 4 is a top perspective view of a portion of the machine of FIG. 1, showing the construction of peening gun oscillating and apparatus rotating means.

As noted hereinabove, the spindles 48A and 48B are shiftable and rotatable. More specifically, as shown in FIGS. 4 and 5, ends of the shafts 50A and 50B, opposite to the ends thereof connected to the springs 56A and 56B extend substantially perpendicularly upwards through a top panel 60 of the peening portion 22 where they are both connected to spindle shifting means, in the form of a pneumatic cylinder 62, and spindle rotating means, in the form of a drive motor 64. The cylinder 62 and the motor 64 are operatively connected to the spindles 48A and 48B so that the spindles 48A and 48B both shift and rotate in unison.

The cylinder 62 allows the spindles 48A and 48B to shift between an open position, illustrated in FIG. 2, and a closed position, illustrated in FIG. 3. To facilitate this shifting, both of the shafts 50A and 50B are connected to a single, common support assembly 66 on which the motor 64 is also mounted. The assembly 66 slidably shifts between the open and the closed positions along a pair of guide rails 68A and 68B in response to actuation of the cylinder 62. In the open position, the engaging portions 52A and 52B are offset upwardly from the portions 42A and 42B, and distal ends of the portions 44A and 44B. This allows the table 24 to index so that parts 16 and sets of spindles 26A and 26B can move into and out of the peening portion 22. In the closed position, the engaging portions 52A and 52B confront and engage the parts 16, thereby clamping the parts 16 between the portions 42A and 42B and the portions 52A and 52B.

It is to be noted that, even after the cylinder 62 has shifted the spindles 48A and 48B into the closed position for peening, the springs 56A and 56B will still provide necessary compensating tolerance to account for variances in the parts 16 on each assembly 11A and 11B. Illustrating by example, if the part 16 on apparatus 11A is axially longer than the part 16 on apparatus 11B, the cylinder 62 will shift the spindles 48A and 48B downwardly until the engaging portion 52B clampingly contacts the upper surface of the part 16 on apparatus 11B. Thus, the clamping of the part 16 on the apparatus 11A may be excessive, and may cause damage to that part 16.

A sensor, not shown, connected to the control device 18 will sense the pressure in the cylinder 62, and the device 18 will cease advancement of the cylinder 62. The weight of the assembly 66 will maintain the assembly 66 and the spindles 48A and 48B in this closed position. The excessive clamping of the part 16 on apparatus 11A is avoided because the spring 56A compensates for the dimensional variances between the two parts 16, and is thusly compressed. Compression of the spring 56A reduces the clamping force applied to the relevant part 16 by the apparatus 11A, thereby independently cushioning the clamping of that part 16 and preventing damage thereto. The spring 56B can perform substantially similarly with respect to the part 16 on apparatus 11B. Accordingly, both parts 16 are held on the apparatuses 11A and 11B by a substantially similar variable cushioned clamping. Therefore, it is to be noted that the cylinder 62 acts as a means for providing a variable cushioned clamping of the parts 16 common to both apparatuses 11A and 11B in conjunction, while the springs 56A and 56B perform as similar but independent means for the apparatuses 11A and 11B, respectively.

Because the portions 52A and 52B must engage the parts 16 in the closed position sufficiently to hold the parts 16 for peening, in a preferred construction, the portions 52A and 52B are hollow for accepting the portions 44A and 44B. In this manner, the portions 44A and 44B can also serve as guides for properly positioning the spindles 26A and 26B with respect to the spindles 48A and 48B. Because the spindle shifting means is pneumatic, the parts 16 are conjunctively cushionly clamped between the portions 42A and 52A and 42B and 52B, thereby reducing the possibility of damage to the parts 16. This, along with the springs 56A and 56B, also allows the cushioned clamping of the parts 16 to be applied automatically by machine, without the aid of a workman. Furthermore, the cushioned clamping of the parts 16 provided by the springs 56A and 56B and the cylinder 62 is sufficient to insure conjoint rotation of the parts 16 and the apparatuses 11A and 11B during processing of the parts 16.

To further insure the conjoint rotation of the apparatuses 11A and 11B and the parts 16, the drive motor 64 is pre-calibrated so that the motor 64 rotates the upper spindles 48A and 48B at the same angular speed at which the drive belt 38 rotates the lower spindles 26A and 26B. Accordingly, the upper spindles 48A and 48B are also rotated on the order of thirty to forty rpm's.

Because both the lower and upper spindles 26A and 48A and 26B and 48B are rotating at the same speed, combined with the fact that the parts 16 are held between the portions 42A and 52A and 42B and 52B by a variably compensating cushioned clamping provided by the springs 56A and 56B and the cylinder 62, conjoint rotation of the apparatuses 11A and 11B and the parts 16 mounted thereon is insured. Suitable sensors 70, some of which are shown in FIG. 2, are provided for monitoring both sets of spindles 26A, 26B, 48A, and 48B for insuring that both spindle sets are rotating at the same speeds. The sensors 70 are appropriately connected to the control device 18. Thus, the need for the forced fit is eliminated, thereby providing for fully automatic operation of the machine 10. The conjoint rotation, combined with the oscillation of the nozzles 32 caused by the means 36, insures that the entirety of the exterior surfaces of the parts 16 will be subjected equally to the high velocity peening fluid. Thus, the parts 16 are properly peened, and should be able to meet all of the relevant government and industry specifications.

With the construction of the machine 10 and the apparatuses 11A and 11B being thusly discussed hereinabove, the operation thereof will now be discussed in detail. It is to be noted that further structural and functional requirements of the invention may become apparent with reference to the following discussion.

To begin operation of the machine 10, a supply bin of parts 16 to be peened is located in an appropriate disposition so that the machine 12 can pick up the parts 16 from the supply bin and place the parts on the spindles 26A and 26B located in the loading/unloading portion 20 of the machine 14. Another, finished part bin is placed adjacent the opposite side of the machine 12 so that peened parts 16 can be placed therein by the machine 12. With this done, the control device 18 begins to operate the machine 10. At this point, the apparatuses 11A and 11B and the doors 28A and 28B are in the open position, and no parts are located on any of the four sets of spindles 26A and 26B.

First, the machine 12 operates as though it is picking up peened parts 16 disposed on the spindles 26A and 26B in the portion 20, rotates, and drops the parts 16 into the finished bin. Then, machine 12 rotates and picks up a pair of parts 16 to be peened from the supply bin. The machine 12 places the parts 16 on the spindles 26A and 26B in the portion 20 such that the guiding portions 44A and 44B are inserted into the holes 47 in the parts 16. The parts 16 travel along the portions 44A and 44B, under the influence of gravity, until the parts 16 contact the supporting portions 42A and 42B. Now the turntable 24 indexes substantially ninety degrees, and the parts 16 on the spindles 26A and 26B are rotated out of the portion 20 and into the peening portion 22. The doors 28A and 28B are now closed by the means 30A and 30B, respectively, under the direction of the control device 18.

After a certain time period predetermined for duration of the peening process, the doors 28A and 28B are opened by the means 30A and 30B, again under the direction of the control device 18, the machine 12 executes another unload/load cycle, as described above with respect to a second set of spindles 26A and 26B, and the table 24 indexes Yet another substantially ninety degrees. The doors 28A and 28B are again closed. At this point, the first-discussed set of parts 16 and spindles 26A and 26B are appropriately located in the peening portion 22 for peening.

As the table indexed the last-discussed substantially ninety degrees, the pulley assemblies 27A and 27B come into operative contact with the drive belt 38. The control device 18 activates the cylinder 62, causing the spindles 48A and 48B to conjunctively shift into the closed position. Under the influence of the cylinder 62 the support assembly 66 slides along the guide rails 68A and 68B until the parts 16 are cushionly clamped between the portions 42A and 52A and the portions 42B and 52B by the cylinder 62. The spindles 48A and 48B are shifted downwardly sufficiently to compress the springs 56A and 56B to a certain degree. This compression of the springs 56A and 56B insures that the springs 56A and 56B will compensate for any dislodging of the parts 16 from the apparatuses 11A and 11B during the peening process. If there are any variances between the parts 16 on the apparatuses 11A and 11B, then the springs 56A and 56B will compensate therefor in the above-described fashion.

Once the appropriate cushioned clamping of the parts 16 has been achieved, the control device 18 activates a motor, not shown, which drives the belt 38, as well as the drive motor 64. Because the motors are precalibrated to rotate at the same angular speeds, on the order of thirty to forty rpm's, the spindles 26A and 48A, and 26B and 48B rotate conjointly. Because of the compensatingly variable cushioned clamping of the parts 16, as discussed above, the parts 16 also rotate conjointly with the spindles. The control device 18 activates the nozzles 32, which bombard the parts 16 with a high velocity peening fluid. The oscillating means 36 is also energized, thereby causing the nozzles 32 to oscillate up and down with respect to the parts 16. In this manner, the parts 16 are fully and properly peened.

It is to be noted that, if, for any reason, the parts 16 shift with respect to the spindles 26A, 26B, 48A and 48B during the peening operation, the springs 56A and 56B are either compressed or relaxed. However, because the springs 56A and 56B always independently cushionly clamp the parts 16 between the portions 42A and 52A, and 42B and 52B, the parts 16 are constantly maintained in proper position for peening throughout the duration of the peening process. During this peening process, the machine 12 executes another unload/load cycle with respect to a third set of spindles 26A and 26B.

After the peening operation has been performed for a certain, predetermined time period, the control device 18 deactivates the nozzles 32 and the means 36. Additionally, the motor 64 and the motor driving the belt 38 are deactivated and the spindles 26A, 26B, 48A and 48B cease their rotation. The control device 18 again activates the cylinder 62, but in a reversed direction. The assembly 66 slides upwardly, as viewed in FIG. 5, along the guide rails 68A and 68B, thereby shifting the spindles 48A and 48B conjunctively into the open position. The means 30A and 30B are activated, thereby opening the doors 28A and 28B, and the table 24 is indexed.

It is to be carefully noted that each time the table 24 indexes, the machine 12 unloads any parts 16 disposed on the spindles 26A and 26B within the portion 20, places them in the finished bin, picks up additional parts 16 to be peened from the supply bin, and loads them onto the same spindles 26A and 26B. At this point, parts 16 disposed on the second set of spindles 26A and 26B, offset substantially ninety degrees behind, with respect to the direction of table 24 rotation, the first set of spindles 26A and 26B discussed in the preceding paragraph, are peened in the above-described fashion. Also, the machine 12 executes another unload/load cycle with respect to a fourth set of spindles 26A and 26B.

After the parts 16 on the second set are peened and the parts 16 are loaded onto the fourth set of spindles 26A and 26B, the control device 18 activates the means 30A and 30B, which open the doors 28A and 28B. The table 24 indexes so that the first set of spindles 26A and 26B is in the portion 20, and the doors 28A and 28B are again closed. Now, as the parts 16 disposed on the third set of spindles 26A and 26B are peened in the above-discussed manner, the machine 12 picks up the peened parts 16 on the first set of spindles 26A and 26B and deposits them in the finished bin. The machine 12 then moves and picks up new parts 16 to be peened, and then loads them onto the first set of spindles 26A and 26B.

The machine 10 can continue to run through the cycle described hereinabove as often as is desired or is necessary to meet a certain production order or schedule. Because the need for a forced fit has been eliminated, the control device 18 is often all that is needed to monitor and to control the operation of the machine 10. For this reason, the device 18 is provided with a plurality of sensors 70, of known construction, some of which are shown in FIG. 2, for monitoring the operation of the machine 10. The illustrated sensors 70 of FIG. 2 monitor rotation of the lower spindles 26A and 26B and the associated pulley assemblies 27A and 27B. Other sensors can monitor, for example, the shifting and rotation of the upper spindles 48A and 48B, and the shifting of the nozzles 32. In this manner, the machine 10 is fully automatic. This can reduce the number of workmen needed to process parts, thereby possibly resulting in greater cost savings to the part manufacturer which can be passed on to the consumer in the form of lower prices for the same parts.

While a preferred embodiment of the present invention is shown and described, it is envisioned that those skilled in the art may devise various modifications of the present invention without departing from the spirit and scope of the appended claims.

The invention claimed is:

1. An automatic machine for processing parts comprising: at least one part hold down apparatus being disposed on a substantially horizontal turntable, said turntable being rotatable between a load/unload position and a processing position, said apparatus releasably holding a part in a predetermined position during processing and being shiftable between an open position for accepting the part and a closed position for holding the part for processing; said apparatus including a lower spindle, an upper spindle, and a compressible spring for providing a variable compensating cushioned clamping of the part for maintaining the part in the predetermined position during processing; said machine having a first drive means connected to said lower spindle for rotating said lower spindle during the processing of the part and a second drive means connected to said upper spindle for rotating said upper spindle during the processing of the part, wherein said first and second drive means rotate said lower and upper spindles at substantially the same rate of rotation; said machine further including a shiftable pneumatic cylinder operatively connected to the apparatus for shifting the apparatus into a closed position.

2. A machine as defined in claim 1, wherein each spindle includes a part engaging portion.

3. A machine as defined in claim 1, further including an automatic unload/load element operatively associated with the turntable for unloading a processed part from and loading a part to be processed on the apparatus.

4. A machine as defined in claim 1, including at least two apparatuses.

5. An automatic machine for processing parts comprising: at least one part hold down apparatus being disposed on a substantially horizontal turntable, said turntable being rotatable to rotate the apparatus between a load/unload position and a processing position, said apparatus releasably holding a part in a predetermined position during processing and being shiftable between an open position for accepting the part and a closed position for holding said part for processing wherein when said apparatus is in the open position the part is held by gravity until the apparatus is closed; the apparatus including a compressible spring for providing a variable cushioned clamping of the part for maintaining said part in the predetermined position during processing, and said machine further including a shiftable pneumatic cylinder connected to the apparatus for closing the apparatus.

6. A machine as defined in claim 5, including at least two apparatuses.

* * * * *